US011259471B2

United States Patent
Angenendt et al.

(10) Patent No.: US 11,259,471 B2
(45) Date of Patent: Mar. 1, 2022

(54) COVER MEMBER FOR A GREENHOUSE, GREENHOUSE, AND USE OF A LAYER FOR A COVER MEMBER

(71) Applicant: OSRAM GmbH, Munich (DE)

(72) Inventors: Guido Angenendt, Munich (DE); Timo Bongartz, Munich (DE); Norbert Haas, Langenau (DE)

(73) Assignee: OSRAM GmbH, Munich (DE)

( * ) Notice: Subject to any disclaimer, the term of this patent is extended or adjusted under 35 U.S.C. 154(b) by 84 days.

(21) Appl. No.: 15/602,632

(22) Filed: May 23, 2017

(65) Prior Publication Data

US 2017/0339844 A1 Nov. 30, 2017

(30) Foreign Application Priority Data

May 24, 2016 (DE) .................... 10 2016 109 519.2

(51) Int. Cl.
| | |
|---|---|
| *A01G 9/00* | (2018.01) |
| *A01G 9/14* | (2006.01) |
| *A01G 7/00* | (2006.01) |
| *A01G 9/20* | (2006.01) |
| *A01G 9/24* | (2006.01) |
| *F21V 33/00* | (2006.01) |
| *G02B 5/20* | (2006.01) |
| *G02B 5/30* | (2006.01) |
| *F21Y 115/15* | (2016.01) |
| *F21W 131/109* | (2006.01) |

(52) U.S. Cl.
CPC ............ *A01G 9/1438* (2013.01); *A01G 7/00* (2013.01); *A01G 9/20* (2013.01); *A01G 9/24* (2013.01); *F21V 33/006* (2013.01); *G02B 5/20* (2013.01); *G02B 5/3025* (2013.01); *F21W 2131/109* (2013.01); *F21Y 2115/15* (2016.08); *Y02A 40/25* (2018.01)

(58) Field of Classification Search
CPC ...... A01G 9/14; A01G 9/1407; A01G 9/1415; A01G 9/1438
USPC ............................................. 47/17
See application file for complete search history.

(56) References Cited

U.S. PATENT DOCUMENTS

| | | | | |
|---|---|---|---|---|
| 4,505,066 A | * | 3/1985 | Moore | A01G 9/14 47/17 |
| 5,022,181 A | * | 6/1991 | Longstaff | A01G 9/1438 47/31 |
| 6,536,157 B2 | * | 3/2003 | Wijbenga | A01G 9/16 47/17 |
| 6,696,703 B2 | * | 2/2004 | Mueller-Mach | H01L 33/50 257/98 |

(Continued)

FOREIGN PATENT DOCUMENTS

| | | |
|---|---|---|
| CN | 101536199 | 9/2009 |
| CN | 102088840 | 6/2011 |

(Continued)

OTHER PUBLICATIONS

Search Report dated Mar. 1, 2017 in corresponding DE App. No. 10 2016 109 519.2.

*Primary Examiner* — Ebony E Evans
(74) *Attorney, Agent, or Firm* — Boyle Fredrickson S.C.

(57) ABSTRACT

A cover member for an in-store greenhouse is disclosed, with which radiation exiting the in-store greenhouse can be influenced or modified, so that outgoing total radiation has a white color on the Planck curve.

16 Claims, 2 Drawing Sheets

(56) References Cited

U.S. PATENT DOCUMENTS

| | | | |
|---|---|---|---|
| 7,015,639 B2 | 3/2006 | Stegamat et al. | |
| 7,316,497 B2* | 1/2008 | Rutherford | H04N 9/315 348/E9.027 |
| 8,739,465 B2* | 6/2014 | Goeschl | A01G 7/045 47/58.1 LS |
| 10,545,375 B2* | 1/2020 | Jeon | F21V 9/30 |
| 2003/0035972 A1* | 2/2003 | Hanson | B32B 7/02 428/480 |
| 2005/0057701 A1* | 3/2005 | Weiss | G02B 27/0101 349/10 |
| 2008/0290319 A1* | 11/2008 | Naum | C09K 11/779 252/301.4 S |
| 2010/0012964 A1* | 1/2010 | Copic | C04B 35/584 257/98 |
| 2010/0053933 A1* | 3/2010 | Meyer | C01B 21/0602 362/84 |
| 2010/0127286 A1* | 5/2010 | Schmidt | C09K 11/0883 257/98 |
| 2011/0016779 A1 | 1/2011 | Hermans et al. | |
| 2011/0115385 A1* | 5/2011 | Waumans | A01G 7/045 315/152 |
| 2012/0107604 A1* | 5/2012 | Aruga | C09D 7/68 428/328 |
| 2012/0252103 A1* | 10/2012 | Deane | C12M 21/02 435/257.1 |
| 2012/0286647 A1* | 11/2012 | Schmidt | C09K 11/7734 313/503 |
| 2013/0008085 A1* | 1/2013 | Aikala | H05B 45/22 47/58.1 LS |
| 2013/0120688 A1* | 5/2013 | Chao | F21V 13/14 349/62 |
| 2013/0258684 A1* | 10/2013 | Yang | F21V 14/02 362/386 |
| 2013/0293963 A1* | 11/2013 | Lydecker | F21V 9/06 359/591 |
| 2015/0013217 A1* | 1/2015 | Johnson | A01G 9/14 47/17 |
| 2015/0069439 A1* | 3/2015 | Deeben | H01L 33/501 257/98 |
| 2016/0013433 A1* | 1/2016 | Yang | H01L 27/301 136/259 |
| 2016/0025288 A1 | 1/2016 | Vasylyev | |
| 2017/0263592 A1* | 9/2017 | Schmidt | C09K 11/886 |
| 2017/0280637 A1* | 10/2017 | Katano | C08L 1/12 |
| 2018/0106460 A1* | 4/2018 | Van Bommel | F21V 9/08 |
| 2019/0055468 A1* | 2/2019 | Oepts | C09K 11/08 |

FOREIGN PATENT DOCUMENTS

| | | |
|---|---|---|
| DE | 10023936 | 11/2001 |
| DE | 10353679 | 6/2005 |
| DE | 102006013142 | 9/2007 |
| DE | 10 2008 003 134 | 6/2015 |
| WO | 2009121701 | 10/2009 |
| WO | 2015091393 | 6/2015 |

* cited by examiner

COVER MEMBER FOR A GREENHOUSE, GREENHOUSE, AND USE OF A LAYER FOR A COVER MEMBER

BACKGROUND OF THE INVENTION

Field of the Invention

The invention relates to a cover member for a greenhouse, in particular an indoor greenhouse or in-store greenhouse or store greenhouse, wherein the cover member is configured as a glass pane or plastic pane or film and is translucent. The invention moreover relates to a greenhouse with at least one cover member of this type. Moreover, the invention relates to use of a film or layer for a cover member.

Description of Related Art

From the prior art, in-store hothouses are known which are comparatively small horticulture greenhouses which can be installed, for example, in large retail stores such as supermarkets. Lighting in supermarkets usually has a shade of white close to or on the Planck curve. For the plants intended for the in-store hothouses, however, an optimal light spectrum of lighting lies far removed from the Planck curve and often has a blue-violet character. This color hue, which is optimal for the plants, would, however, usually be seen as disturbing in supermarkets, for example, by customers.

SUMMARY OF THE INVENTION

It is the object of the present invention to solve the stated problem.

According to the invention, a cover member for a greenhouse is provided, in particular around a greenhouse arranged inside of a room (e.g., in-store greenhouse or store greenhouse), wherein the cover member is translucent and has an inner and an outer side. Advantageously, the cover member is configured such that radiation which radiates through the cover member from the inner side can be influenced and/or modified.

This solution has the advantage that electromagnetic radiation of an interior lighting or horticulture lighting of the in-store greenhouse which shines to the outside can be modified or influenced by the cover member. In this way, it is possible to generate radiation exiting the in-store greenhouse which is not regarded as disturbing by a customer of a supermarket, for example, in which the in-store greenhouse is installed. It is possible, for example, to create radiation with a white hue. Thus, it is possible with technically simple means to influence an electromagnetic radiation with an active cover member, in order to avoid radiation exiting the in-store greenhouse with, for example, a blue-violet character.

The indoor greenhouse may be an in-home greenhouse (for example, a spice cabinet for at home), an in-store greenhouse (for example, in the supermarket), an in-restaurant greenhouse (in a restaurant), an in-hotel greenhouse (in a hotel), an in-company greenhouse (in a company), an in-public greenhouse (in hospitals, subway stations, schools, universities, museums, other public spaces). The greenhouse may, for example, also be a city greenhouse or a rooftop greenhouse, which are illuminated at night and thus might cause 'light pollution' for the residents.

Preferably, the cover member is configured such that it can modify the hue of the light of the radiation and/or the polarization of the radiation for influencing the radiation.

Preferably, the cover member is configured as a filter which filters out specific wavelengths, in particular blue-violet wavelengths of the radiation, for influencing the radiation.

Alternatively or additionally, it may be provided that additional radiation is added via the cover member for influencing the radiation. In this way, wavelengths are added to the radiation exiting the in-store greenhouse.

Alternatively or additionally, it is thinkable that the cover member is configured as a converter for influencing the radiation. The cover member can then convert the exiting radiation at least with regard to a part of its wavelengths.

Alternatively or additionally, it may be provided that the cover member acts as a polarizer for influencing the radiation. Thus, at least parts of the radiation which exit the in-store greenhouse can be filtered out over all wavelengths by utilizing the polarization. Preferably, the interior light emits polarized light. This embodiment is furthermore advantageous, since a polarizer is quite inexpensive. Moreover, the polarizer acts advantageously independently from the wavelengths of the radiation. If the radiation is a dynamic radiation, for example, which changes over time with regard to its spectrum, then this has no influence on the polarization effect of the polarizer. The polarizer can therefore easily be used for different radiations.

The cover member is advantageously configured as a translucent pane, in particular a glass pane or plastic pane. Alternatively, it is thinkable that the cover member is configured as a hothouse film. A layer or alternatively a film for influencing the radiation can be applied to the pane or hothouse film in a technically simple manner. Thus, it is thinkable that the exiting radiation is not influenced by the pane or hothouse film itself, but by the applied layer or film. Alternatively or additionally, it may be provided that the pane or hothouse film comprises a conversion substance, or a luminescent substance, or a luminescent substance mixture in order to act as a converter, as was already described. Thus, the cover member can influence or modify the radiation in a simple way via the layer or film applied to the cover member.

In order for the cover member to be able to act as a filter, the applied layer or film is advantageously configured as a color filter. This color filter is preferably configured as a dichroitic filter or interference filter. Thus, the layer or film can dim or filter out specific wavelengths of the radiation exiting the in-store greenhouse. Preferably, the color filter filters out blue-violet radiation. Due to the filter, remaining wavelengths of the exiting radiation are perceived as white light or at least as having less of a blue hue.

Alternatively or additionally, the additional radiation can be added with the applied layer or film, in that the additional radiation can be emitted by means of the layer or film at least via the outer side of the cover member. Thus, specific wavelengths can be added to the radiation exiting the in-store greenhouse. In this sense, a layer or film, which radiates off specific wavelengths towards the outside which blend together with the radiation of the blue-violet interior light of the in-store greenhouse to form a whiter radiation, is applied to the cover member configured as a hothouse film or pane. Preferably, the layer or film is technically simply a translucent or transparent, organic light-emitting diode, such as an Organic Light-Emitting Diode (OLED). The light-emitting diode, for example, emits yellow radiation which together with the radiation of the interior light of the in-store greenhouse results in whitish radiation. If the radiation exiting the in-store greenhouse changes dynamically, for example with regard to its spectrum, it is thinkable that the additional radiation is adapted thereto.

The layer or film applied to the pane or hothouse film may alternatively or additionally also be configured as a converter. Thus, a film or layer is applied to the pane or hothouse film, which converts specific wavelengths at least partially into other wavelengths, so that the resulting radiation exiting the cover member can be perceived as white light. The layer or film can thus convert specific wavelengths of the interior light of the in-store greenhouse into other wavelengths.

For conversion, the pane or hothouse film and/or the layer applied to the pane and/or the film applied to the pane for conversion comprises a luminescent substance or a luminescent substance mixture, such as a Cer-YAG luminescent substance mixture and/or nanomaterials (e.g., nanodots, nanocrystals). If a layer or film is provided as converter, it can be configured, in particular as a luminescent substance coating, such that merely a partial conversion of the radiation takes place, for example blue to yellow. Non-converted radiation and converted radiation then advantageously form the exiting radiation which is perceived as white light. For example, the layer or film is only a few micrometers thick or even thinner than this.

The layer or film acting as converter (luminescent substance coating) is preferably applied to the inside and/or the outside of the pane of the cover member, for example, technically simple by spraying. Thus, the layer may be a spray coating. It is also thinkable to use a film containing a luminescent substance. Alternatively or additionally, the pane made of glass, for example, may also be provided with the luminescent substance dots or nanodots during the manufacture, for example, by embedding them in a glass-sintering process.

Alternatively or additionally, it is thinkable that the layer or film applied to the pane or the hothouse film is configured as a polarizer. Thus, the film or layer which only permits light of a specific polarization is applied to the pane or hothouse film of the cover member. It is thinkable for a further embodiment of the invention that the layer or film acting as a polarizer has a uniform polarization or has regions with different polarization. It is furthermore advantageous that for such a layer or film, the in-store greenhouse does not appear to be dark, since it is also illuminated by the light of the supermarket due to the translucent or transparent panes of the cover member. This light is unpolarized and is usually filtered out only to a small extent—if the polarization happens to coincide—by the layer or film (polarization filter) acting as polarizer, when it passes from the outside to the inside as well as for a reflection from the inside to the outside. In order to polarize a weakly polarized light of the interior light of the in-store greenhouse, different polarization methods can be used, such as linear or circular polarization. The layer or film configured as polarizer may be formed as h-filter or of a combination of h-filters and λ/4-layers, or of layers made of chiral molecules, such as, for example, wire-grid polarizers, and/or by reflection with a Brewster angle.

According to the invention, a greenhouse or an in-store greenhouse is provided with at least one cover member or several cover members according to one or more of the preceding aspects. At least one interior light is arranged in the in-store greenhouse which generally emits unpolarized light. In the in-store greenhouse according to the invention, essentially non-disturbing white light can shine to the outside in a technically simple manner.

Advantageously, the interior light emits partially polarized light or essentially completely polarized or completely polarized light. This has the advantage that at least part of the radiation can be blocked in the cover member configured as polarizer. Preferably, the interior light radiates polarized radiation which is preferably emitted orthogonally to the polarization direction of the cover member acting as polarizer. When the radiation passes through the cover member configured as polarizer, thus the radiation is filtered out that is orientated orthogonally to the polarization orientation of the cover member. Even if not the whole radiation is covered by this, a significant part of the emitted radiation can still be blocked.

Moreover, it is advantageous for an interior light which emits polarized light that growth of the plants is positively influenced by this.

A radiation source of the interior light may, for example, use the Laser Activated Remote Phosphor technology (LARP technology), which may then be a transmissive LARP light source. In the LARP technology, a conversion element spaced away from the radiation source, which comprises a luminescent substance or is made of this, is irradiated with an excitation radiation, in particular an excitation ray (pump ray, pump laser ray), in particular with the excitation ray of a laser diode. The excitation radiation of the excitation ray is absorbed by the luminescent substance and at least partially converted into a conversion radiation (emission radiation), whose wavelengths and thus spectral properties and/or color are determined by the conversion properties of the luminescent substance. With the help of the conversion element, for example, blue excitation radiation (blue laser light) can be converted into red or green or yellow conversion radiation (conversion light, illumination light).

If, for example, blue laser light is used as excitation radiation, the non-converted, blue rest radiation is advantageously polarized and can be filtered out by the polarizer.

For use according to the invention, a film or a layer is used for a cover member of a greenhouse on indoor greenhouse. The film or layer may be configured as a color filter, and/or additional radiation can be emitted with the film or layer, and/or the film or the layer can be configured as a translucent, organic light-emitting diode, and/or the film or layer can be configured as a converter, and/or the film or layer can be configured as a polarizer. A cover member of an in-store greenhouse can therefore easily be upgraded with the film or layer in order to modify or influence the exiting radiation.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

In the following, the invention will be explained in more detail by means of the figures. The figures show.

DETAILED DESCRIPTION OF THE PREFERRED EMBODIMENTS

Figure 1A:
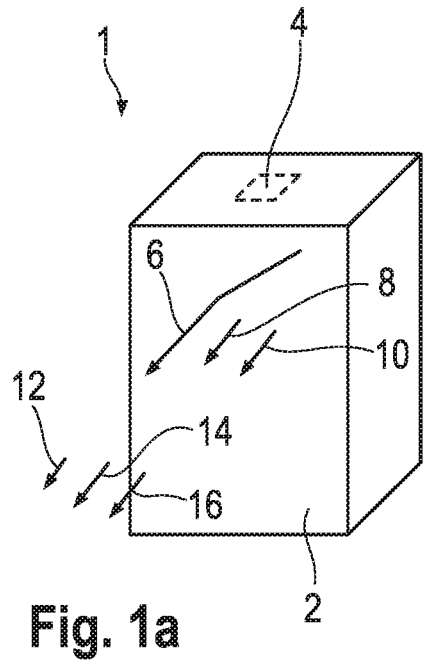
FIG. 1a and FIGS. 2 to 4 each show a schematic view of an in-store greenhouse each according to an embodiment.

According to FIG. 1a, an in-store greenhouse 1 is shown which has several cover members 2 as outer walls. The translucent cover members 2 are configured as panes. Plants can be arranged inside the in-store greenhouse 1, which can be irradiated with a blue-violet radiation via an interior light 4. The radiation emitted inside the in-store greenhouse 1 by the interior light 4 is schematically shown in FIG. 1a. The radiation comprises a blue ratio 6, a yellow ratio 8, and a red ratio 10. The blue ratio 6 is greater than the yellow and red ratios 8, 10, which is shown by an elongated arrow. In order for the radiation exiting the in-store greenhouse 1 to be perceived as white light, the panes of the cover members 2 are equipped with a layer which filters out or dims specific wavelengths. The cover members 2 thus act as a filter. According to FIG. 1a, in particular wavelengths in the blue range are filtered out. The radiation that exited the in-store greenhouse 1 has, according to FIG. 1a, a blue ratio 12, a yellow ratio 14 and a red ratio 16. It can be seen that by means of the cover members 2 acting as filters, the blue ratio 12 of the exiting radiation is decreased as compared to the blue ratio 6 of the interior light 4.

Figure 1B:
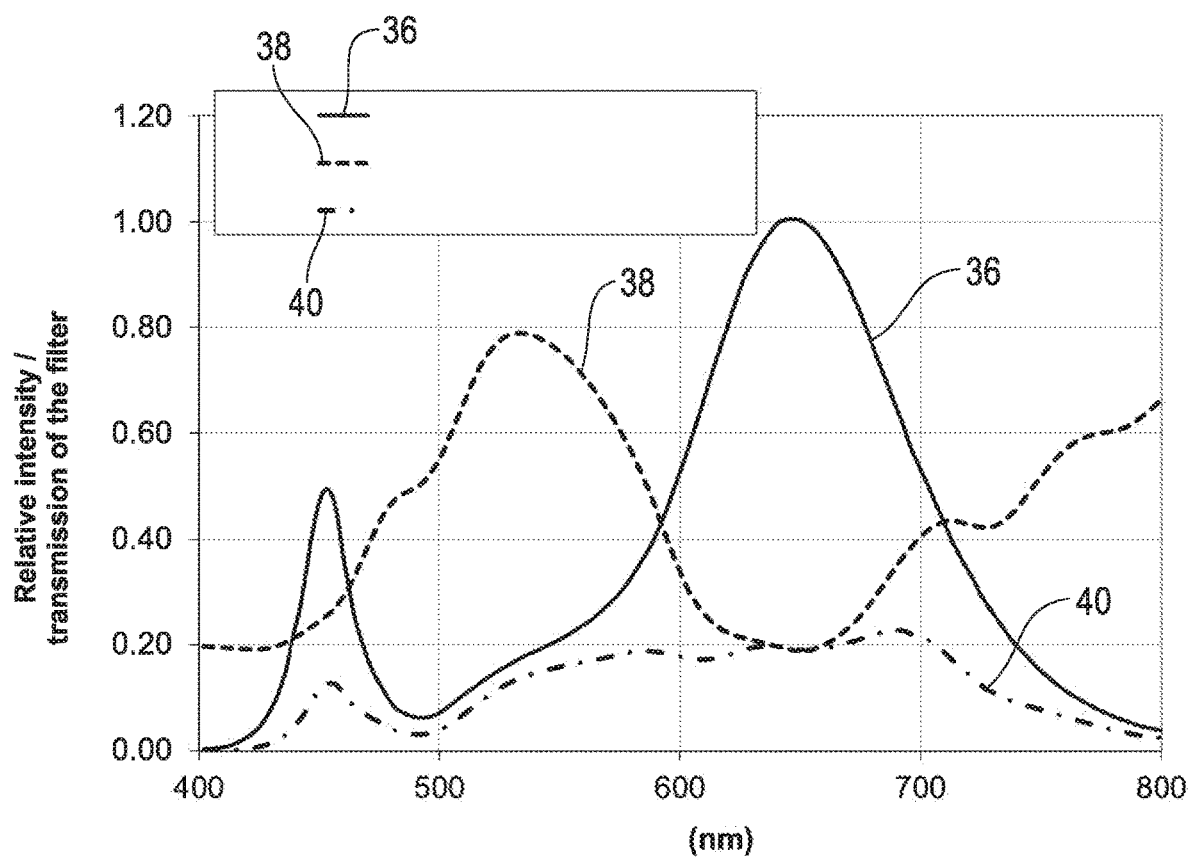
FIG. 1b shows light spectra and the transmission spectrum of a color filter in a curve representation.

FIG. 1b shows light spectra and the transmission spectrum of a color filter or a cover member. The wavelengths is stated in nanometers on the abscissa, the relative intensity of the light source with regard to the maximum or respectively the relative transmission of the filter is stated on the ordinate. The light or interior light for an in-store greenhouse in this case has a spectrum 36 with a high red and blue ratio. Moreover, the transmission spectrum 38 of a green filter can be seen which preferably filters out wavelengths in the blue range (about 450 nm) and in the red range (about 650 nm), but which permits the green color of the light (about 550 nm) to approx. 80%. The filter consists partially or completely of polyvinyl chloride and has in particular a thickness of 100 µm. Moreover, the filtered spectrum 40 is shown as perceived by an observer standing outside the in-store greenhouse. This spectrum 40 no longer shows any distinctive peaks for specific wavelengths, it is perceived as white by an observer.

Figure 1C:
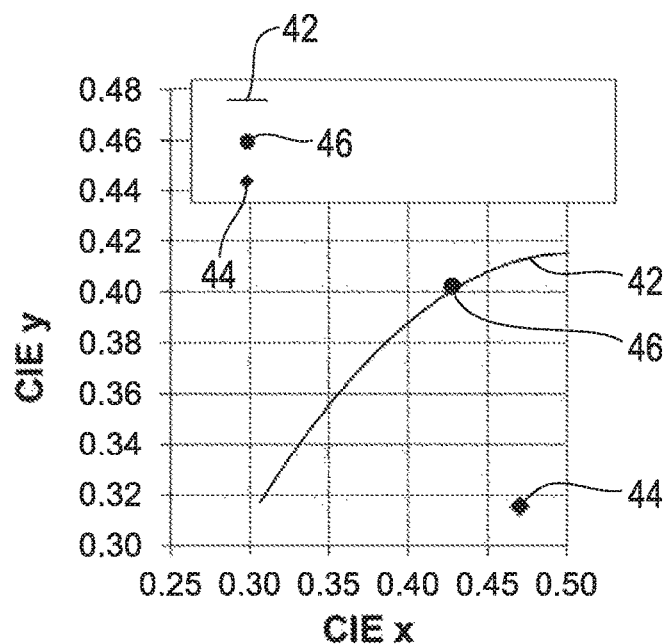
FIG. 1c shows a CIE standard color system.

It can be seen in FIG. 1c how the color coordinate changes in the CIE standard color system by using the filter or cover member. The solid line shows the Planck curve 42 whose colors are perceived as white hues. A color point 44 of a light for the in-store greenhouse originally shows a color which clearly lies below the Planck curve. It has a rather violet color. By using the filter, a new color point 46 results which now almost perfectly lies on the Planck curve and which is consequently perceived as white by observers standing outside the in-store greenhouse. In this case, coordinates of CIEx=0.428 and CIEy=0.403 were reached. The correlated color temperature of the filtered spectrum is at 3150 Kelvin.

Apart from the effect that the observers perceive the light to be white, the plants cultivated in the in-store greenhouse appear authentically in their color due to the filter or cover member.

Figure 2:
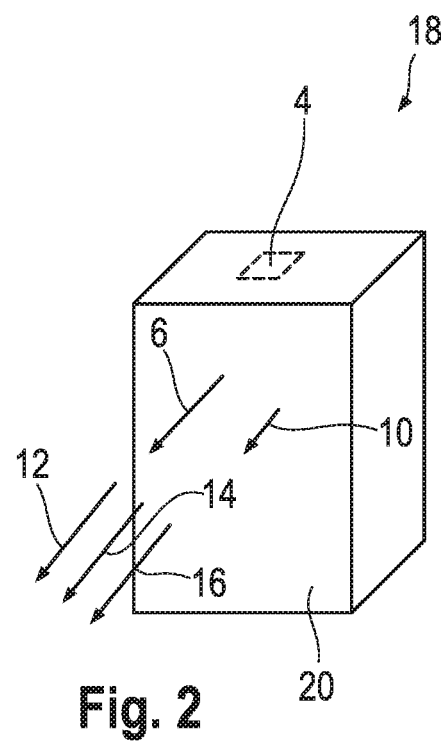

According to FIG. 2, an in-store greenhouse 18 is provided having cover members 20 whose panes have a layer applied to them, wherein the layer additionally emits radiation (additional radiation). The layer is, for example, an organic light-emitting diode. According to FIG. 2, the radiation emitted by the interior light 4 has the blue ratio 6 and the red ratio 10, wherein the blue ratio is significantly greater. Now, radiation is blended in via the cover members 20, whereby the radiation exiting towards outside has a whitish character instead of a blue-violet character. According to FIG. 2, the ratios 12, 14 and 16 are essentially the same in the exiting mixed radiation. Moreover, due to the additional radiation, the light intensity of the radiation exiting towards outside may be higher than the light intensity emitted by the interior light 4 due to the additional radiation. Moreover, for example, a part of the blue radiation emitted by the interior light 4 may be absorbed by the cover member 20.

Figure 3:
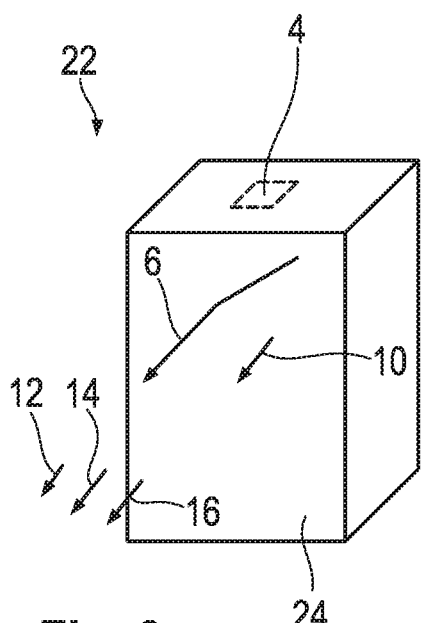

In FIG. 3, an in-store greenhouse 22 has cover members 24, whose panes each have a layer applied to them which acts as a converter. The layer measuring only a few micrometers may comprise yellow luminescent substances as luminescent substance, such as, e.g., Cer:Yag. Due to this reason, for example, the blue ratio 6 emitted by the interior light 4 can be at least partially converted into a yellow ratio 14. Thus, the radiation emitted by the interior light 4 may have a comparatively high blue ratio 6 and the red ratio 10, and the radiation exiting towards the outside may then have ratios 12 to 16. Due to this, it is possible that a strong blue ratio 6 may be partially converted into the yellow ratio 14 by the yellow luminescent substance, in order to create a whiter radiation together with the unconverted remaining blue ratio 12.

Figure 4:
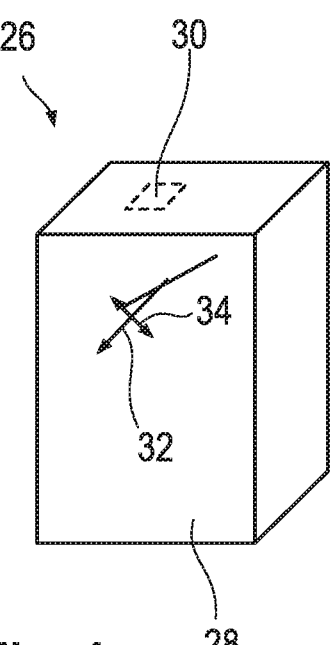

According to FIG. 4, an in-store greenhouse 26 has cover members 28 acting as polarizers. A layer is applied to the panes of the cover members 28 which only permits radiation of a specific polarization. An interior light 30 emits polarized radiation 32, wherein at least part of the radiation 32 is emitted orthogonally to the polarization direction 34 of the cover member 28. When passing through the cover member 2, the radiation is filtered out which is emitted orthogonally to the polarization direction 34.

A cover member for an in-store greenhouse is disclosed, with which radiation exiting the in-store greenhouse can be influenced or modified.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. A method for modifying radiation exiting a greenhouse, the method comprising:
   providing a cover member for the greenhouse;
   using a film or a layer for the cover member of the greenhouse;
   an interior light configured to irradiate plants in the greenhouse with radiation emitted from the interior light including multiple emitted light portions defining corresponding multiple color ratios; and
   wherein the film or layer is configured such that a radiation which radiates from the inner side through the cover member is modified by filtering the multiple color ratios in different amounts, so that outgoing total radiation from the inner side to the outer side of the cover member and exiting the greenhouse has a white color on the Planck curve, and wherein the film or layer is configured as a color filter, and/or wherein additional radiation can be emitted with the film or layer, and/or wherein the film or the layer is configured as a converter, and/or wherein the film or the layer is configured as a polarizer.

2. The method according to claim 1, wherein the cover member comprises polyvinyl chloride.

3. The method according to claim 2, wherein the polyvinyl chloride has a thickness of about 100 µm.

4. The method according to claim 1, wherein the cover member is a configured as a translucent greenhouse pane for the greenhouse.

5. An indoor greenhouse system for use inside a building comprising:
- an indoor greenhouse arranged inside the building and having interconnected walls providing a greenhouse enclosure for growing plants;
- an interior light configured to irradiate plants in the greenhouse enclosure with radiation emitted from the interior light including multiple emitted light portions defining corresponding multiple color ratios; and
- a cover member defining at least a portion of the greenhouse enclosure and configured as a translucent greenhouse pane having an inner side facing inwardly into the greenhouse enclosure and an outer side facing outwardly away from the greenhouse enclosure and toward the building in which the indoor greenhouse is arranged, the translucent greenhouse pane being configured such that radiation from the outer side is operable to radiate through the pane to irradiate plants on the inner side while influencing radiation from the inner side through the pane to the outer side by filtering the multiple color ratios in different amounts, so that outgoing total radiation from the inner side to the outer side of the cover member and exiting the greenhouse has a white color on the Planck curve.

6. The greenhouse according to claim 5, wherein the translucent greenhouse pane includes a layer or film applied for influencing the radiation.

7. The greenhouse according to claim 5, wherein the translucent pane comprises a conversion substance.

8. The greenhouse according to claim 6, wherein the layer or film is configured as a color filter.

9. The greenhouse according to claim 6, wherein the layer or the film is configured as a translucent, organic light-emitting diode.

10. The greenhouse according to claim 6, wherein the layer or the film is configured as a converter.

11. The greenhouse according to claim 10, wherein the layer and/or the film comprises for conversion a luminescent substance or a luminescent substance mixture and/or nanomaterials.

12. The greenhouse according to claim 6, wherein the layer is configured as a polarizer.

13. The greenhouse according to claim 5, wherein the interior light emits at least partially polarized radiation, and/or wherein the interior light emits light which is adapted to plants that can be arranged in the greenhouse.

14. The greenhouse system according to claim 5, wherein the interior light is configured to produce a blue-violet radiation and at least one of a yellow radiation and a red radiation and wherein the cover member is configured for filtering the blue radiation to a greater extent than filtering the at least one of the yellow radiation and the red radiation to provide the outgoing total radiation exiting the greenhouse as the white color on the Plank curve.

15. The greenhouse system according to claim 5, wherein the cover member comprises polyvinyl chloride.

16. The cover member according to claim 15, wherein the polyvinyl chloride has a thickness of about 100 μm.

* * * * *